Figure 2:
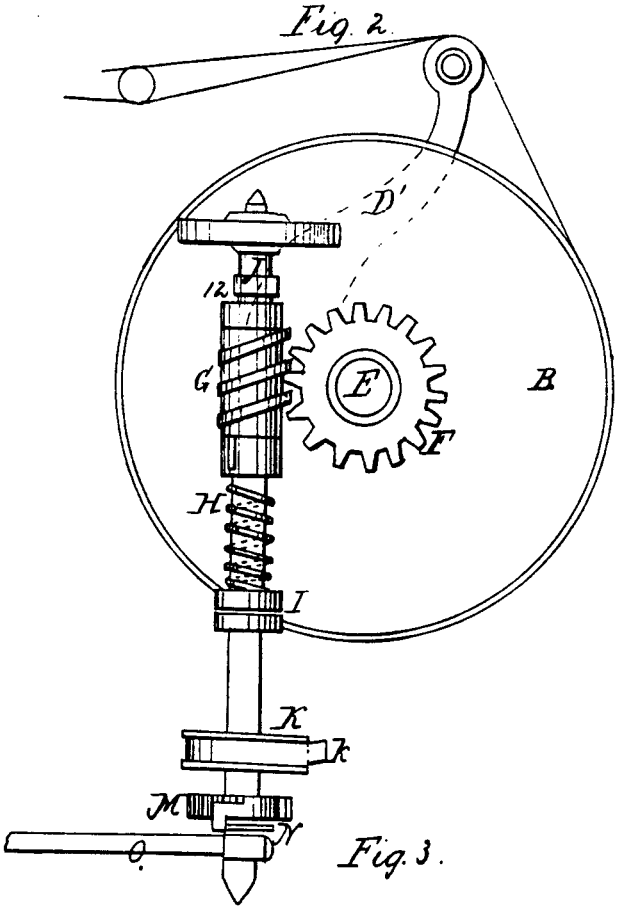
Figure 3:
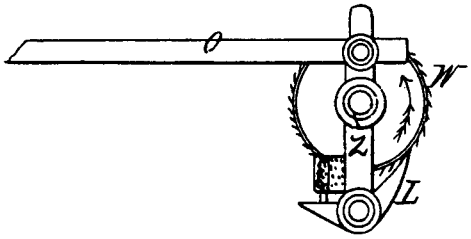

Sheet 1-2 Sheets.

Snell & Bartlett.

Cloth Weaving Mach.

No. 176. A. I. Patented Oct. 6, 1857.

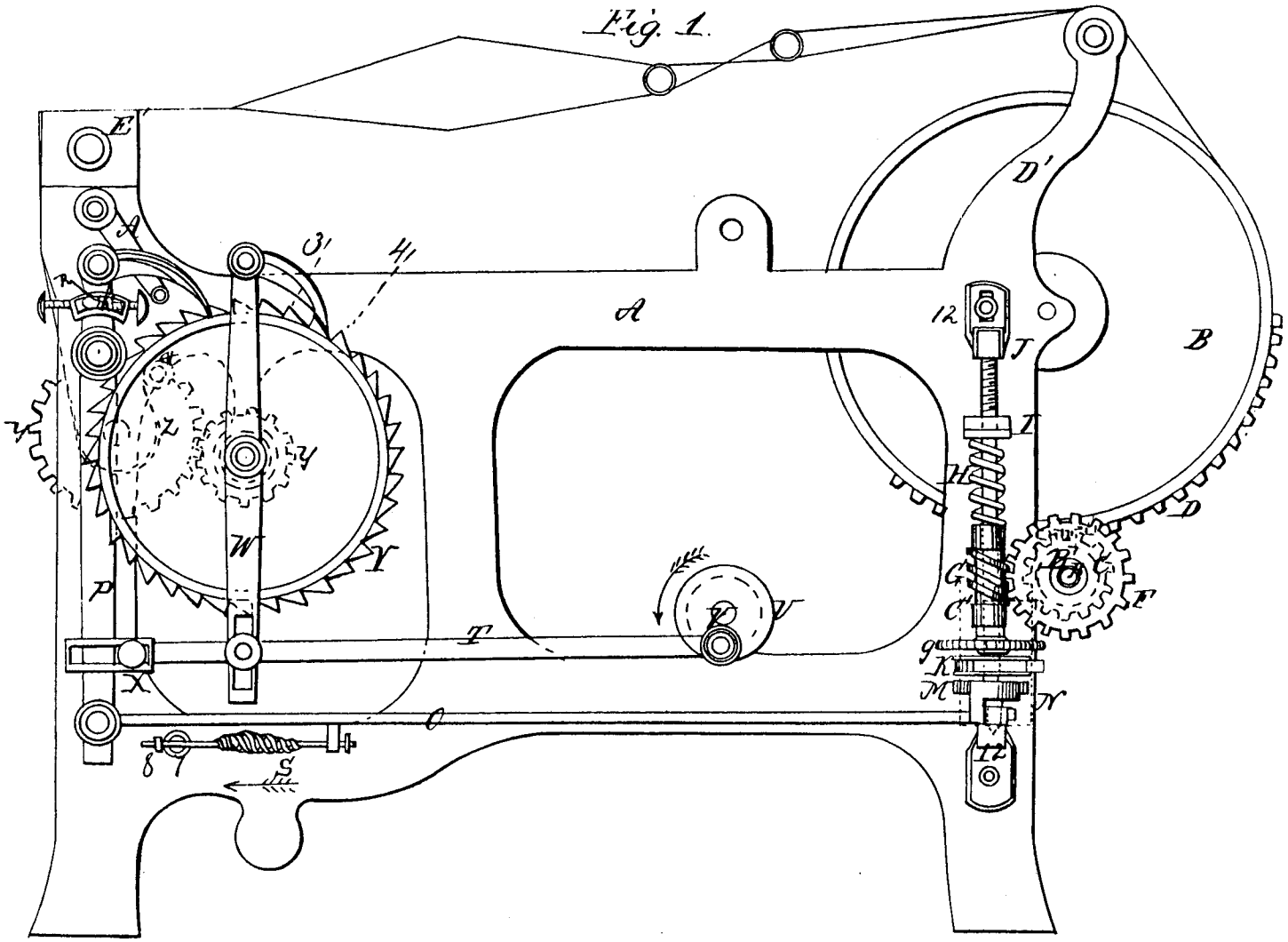

No. 176, to original Letters Patent No. 16,405.—*Improved Mechanism in Looms for Weaving Cloth.*—We claim, first, the application of the worm gear F, in combination with the pinion shaft E and pinion C, as and for the purpose represented.

Second. The spring H, acting as shown, for the purpose of giving a yielding motion to the beam at the change of harnesses and beating up of the reed.

Sheet 2-2 Sheets.

Snell & Bartlett.

Cloth Weaving Mach.

No. 176. A.I. Patented Oct. 6, 1857.

N. PETERS, PHOTO-LITHOGRAPHER, WASHINGTON, D. C.

DEPARTMENT OF COMMERCE
UNITED STATES PATENT AND TRADEMARK OFFICE

---

MISSING PAGE(S)

PATENT NUMBER AI 176 FOR THE ISSUE DATE 10/06/1857 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text